United States Patent [19]

Hall, Jr.

[11] 3,861,809
[45] Jan. 21, 1975

[54] CONFOCAL CAVITY OPTICAL GAS SENSOR

[75] Inventor: Joseph F. Hall, Jr., Santa Ana, Calif.

[73] Assignee: The Perkin-Elmer Corporation, Norwalk, Conn.

[22] Filed: Apr. 6, 1973

[21] Appl. No.: 348,645

[52] U.S. Cl................. 356/188, 250/343, 356/51, 356/189, 356/205, 356/246
[51] Int. Cl......................... G01j 3/48, G01n 21/22
[58] Field of Search....... 356/75, 246, 244, 75, 112, 356/201-206, 188, 189, 51; 350/294, 299; 250/343-346, 510

[56] References Cited
UNITED STATES PATENTS

| | | | |
|---|---|---|---|
| 3,089,382 | 5/1963 | Hecht et al. | 356/51 |
| 3,250,174 | 5/1966 | Lutz | 356/51 |
| 3,588,496 | 6/1971 | Snowman | 356/51 |
| 3,696,247 | 10/1972 | McIntosh et al. | 356/51 |
| 3,704,951 | 12/1972 | Chupp | 356/75 |
| 3,728,540 | 4/1973 | Todd et al. | 250/343 |

*Primary Examiner*—Vincent P. McGraw
*Attorney, Agent, or Firm*—John K. Conant

[57] ABSTRACT

An optical gas sensor is described wherein a confocal cavity, which contains a gaseous mixture for detection of a particular gas, is exposed to a collimated light beam. The light beam includes wavelengths, which exhibit a particular transmission characteristic upon passage through the particular gas in the cavity. The confocal cavity provides a high multiple of reflections of the light beam to enable the detection of a gas such as carbon monoxide by monitoring the relative change in the transmission of light within the absorption band for carbon monoxide. A significant reduction in the length of the optical sensor is obtained while maintaining sensitive detection of carbon monoxide levels by comparison with the transmission of light wavelengths lying outside the absorption band and being passed through the confocal cavity.

6 Claims, 4 Drawing Figures

PATENTED JAN 21 1975
3,861,809
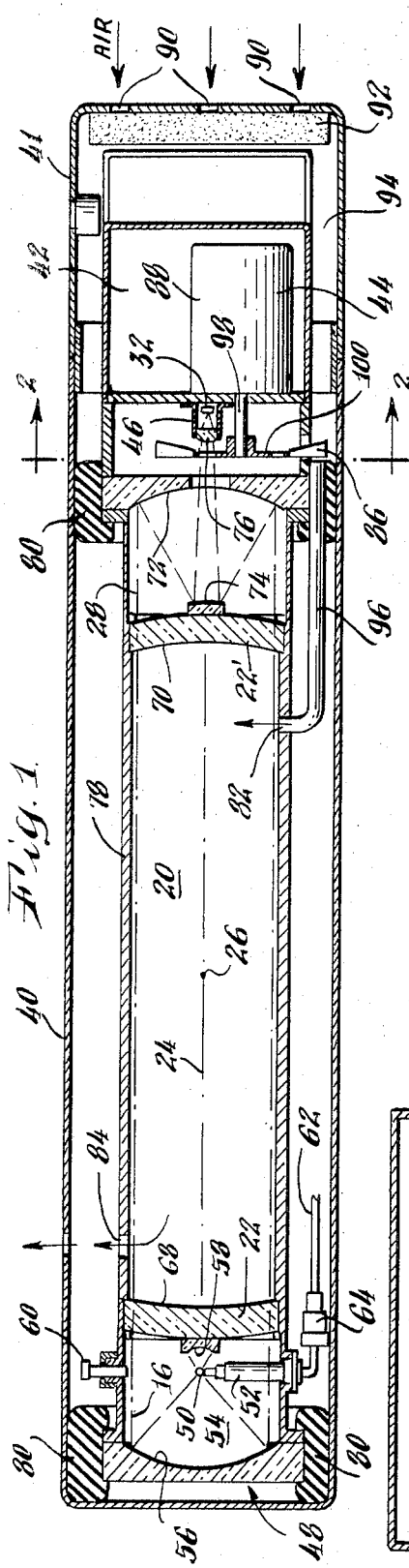
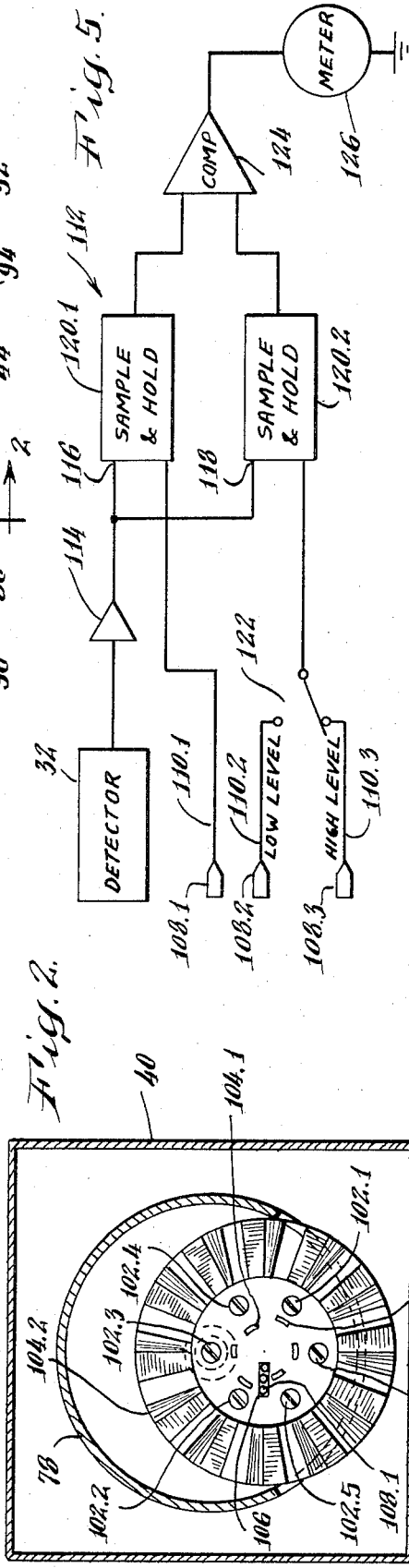
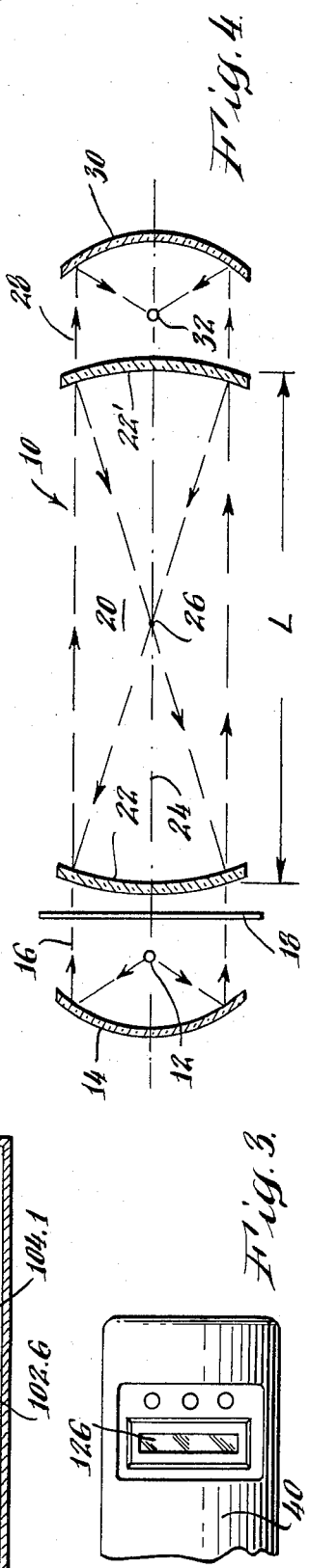

CONFOCAL CAVITY OPTICAL GAS SENSOR

FIELD OF THE INVENTION

This invention relates to a gas sensor. More specifically, this invention relates to an optical sensor to detect carbon monoxide in a mixture of air.

BACKGROUND OF THE INVENTION

Optical sensors for detecting gases such as carbon monoxide have been used by sensing the loss of transmission along a known pathway at a particular wavelength of light, such as 4.6 microns. In such apparatus, the exponential absorption enables one to produce a reading of the concentration of the carbon monoxide present in air. A problem associated with conventional optical sensing techniques is caused by the small carbon monoxide absorption coefficient in air. The small coefficient necessitates an extremely long test path to measure the amount of carbon monoxide within acceptable accuracies.

Carbon monoxide, which is toxic to man when inhaled in abnormal concentrations, needs to be detected at relatively low levels. Commonly accepted safety standards set the maximum level of carbon monoxide in air at ranges which vary from 10 to 50 parts per million with a most frequent maximum level being set around 25 parts per million. Carbon monoxide unfortunately is a colorless, tasteless and odorless gas whose presence in unacceptable amounts in air creates an oxygen deficency that reduces a person's performance when exposed to a high level of carbon monoxide.

In the known carbon monoxide optical sensor, the long optical path length needed to measure the presence of carbon monoxide is achieved by a multiple folding of a light beam having a wavelength with the absorption band for carbon monoxide. Typcially, a folded system will have an equivalent path length of 10 meters with an actual length of approximately one meter. The one meter length is unacceptable for use in, for example, the cockpit of an airplane or other areas where space is of great demand.

SUMMARY OF THE INVENTION

In a gas sensor in accordance with the invention, collimated radiation from a light source is projected into a confocal cavity through an input partial reflector. The collimated beam is incident upon a second output partial reflector which returns most of the incident beam into an image of the source of light at the center of the confocal cavity. The image energy then is again reflected by the first input reflector for another collimation to thereby return to the output reflector.

This process of multiple reflections is repeated in an infinite number of times with diminishing intensities since with each reflection a small portion of the energy is transmitted through the end located reflectors. The total light radiation transmitted through the output reflector is directed upon a detector to produce an electrical signal indicative of the magnitude of the transmitted light.

An optically sensitive element is employed such as an interference filter by which the light incident upon the detector may be divided into light which falls within the absorption band for the particular gas whose presence is to be detected and measured and a reference light which falls outside the absorption band. An electronic network then provides a comparison between signals representative of the absorption and reference light with an output signal indicative of the magnitude of the particular gas in the mixture.

The optical gas sensor in accordance with the invention achieves enhanced sensitivity with a configuration size which is substantially smaller compared to conventional optical gas detectors. The unique summation of the semi-infinite number of interreflections occurring in the highly reflecting confocal cavity enables the reduction in the physical length yet with high quality sensitivity in the detection of the particular gas such as carbon monoxide.

It is, therefore, an object of the invention to provide an optical gas sensor of a reduced size with excellent sensitivity. It is a further object of the invention to provide a compact optical gas detector for sensing the presence of carbon monoxide in an air mixture in an accurate and reliable manner.

BRIEF DESCRIPTION OF DRAWINGS

These and other advantages and objects of the invention may be understood from a description of the following embodiment of a gas optical sensor in accordance with the invention described in conjunction with the drawings wherein FIG. 1 is a section view of an optical gas sensor in accordance with the invention;

FIG. 2 is a section view taken along the line 2—2 of the optical gas sensor shown in FIG. 1;

FIG. 3 is a partial side view of the optical gas sensor shown in FIG. 1 to illustrate the meter scale indication;

FIG. 4 is a schematic presentation of the confocal optical gas sensor in accordance with the invention; and FIG. 5 is a block diagram view of an electrical network employed to process the electrical signals generated by the optical gas sensor in accordance with the invention.

DETAILED DESCRIPTION OF EMBODIMENT

With reference to FIG. 4, a schematic presentation of a confocal optical gas sensor 10 in accordance with the invention is illustrated. A source of light 12 is shown located at the focal point of a collimating reflector element 14 which directs a collimated beam 16 through a narrow band filter 18 into a confocal cavity 20 formed by a pair of opposing spherically shaped highly reflective reflectors 22–22'. As shown the collimating reflector is dimensioned to provide a collimated beam 16 whose diameter approximates the diameter of the cavity 20 and the filter 18 and the reflector 22 are correspondingly dimensioned so that the beam 16 entering the cavity fills the major portion of the diameter of the cavity.

Filter 18 is characterized by a bandwidth which includes the absorption band for carbon monoxide, i.e. from 4.5 to 4.8 microns and a band of light outside the absorption band such as at 4 microns. Reflectors 22–22' are spaced from each other by a distance L as measured along optic axis 24 and which is twice their radius of curvature so that the collimated beam 16, after passing through the first spherical confocal reflector 22, is directed parallel with optic axis 24 upon reflector 22'. The latter in turn forms an image of the light source 12 at the center 26 of cavity 20. The center image is then re-collimated by confocal reflector 22 and again directed upon reflector 22'.

The confocal reflectors 22-22' are highly reflective, about 99 percent, with about 1 percent transmissivity. The transmission through reflector 22' is sufficient to enable the accumulation of a detectable quantity from the partial transmission of light with each reflection. The transmitted light 28 is incident upon an optical collector 30 which focuses the transmitted light onto a detector 32. Detector 32 produces an electrical signal indicative of the magnitude of the light incident upon it. With comparison of the light transmitted at the absorption wavelength with that outside the absorption band, a signal indicative of the amount of carbon monoxide is generated and displayed.

The number of reflections within the confocal cavity approaches a semi-infinite number by reason of the highly reflective nature of the surfaces employed. As a result, the cavity appears to have an effective length far in excess of that commonly employed with conventional mirror folded systems for measuring or sensing carbon monoxide gases and the like. The apparent increase in path length may thus be accompanied with a reduction in actual length while maintaining an effective gas detection sensitivity. For example, the length L may be about one-fourth the length of a conventional mirror folded gas sensor with the same gas sensing performance.

An optical carbon monoxide sensor in accordance with the invention is more particularly shown in the section views in FIGS. 1 and 2. A longitudinal rectangular main housing 40 encloses at one end 41 an electronics package 42, a gas drive 44 and light detecting elements 46. A cylindrical confocal cavity 20 is located between a light beam generator 48 and end 41.

Light beam generator 48 includes an infrared light source 50 mounted on a replaceable fixture 52 and is located in a hermetically sealed cylindrical chamber 54 and at the focal point of a parabolic reflector 56 and a retro reflector 58. Light source 50 may be an infrared light producing filament of tungsten operated in an inert gaseous atmosphere to prevent oxidation of the filament. A purge valve 60 is provided to back fill the chamber 54 with inert gas. A viewing port (not shown) is located at about 90° from the valve 60 to enable a visual monitoring of light source 50 which is electrically powered through a cable 62 and connector 64.

Light from essentially point source 50 and retro reflector 58 is formed into a collimated beam 16 which passes through a confocal reflector 22 having a spherical highly reflecting surface 68 with its radial center at 26 on optic axis 24. The collimating optics is of the Maksutov design. As shown the parabolic reflector 56 and the reflector 22 are dimensioned so that the collimated beam 16 entering the cavity 20 fills the major portions of the diameter of the cavity.

Collimated beam 16 passes through cavity 20 onto output partial reflector 22'. A small portion 28, about 1 percent, of the light incident upon reflector 22' is transmitted through partial reflector 22' with the remainder being reflected by surface 70' and formed into an image of source 50 at the center 26 of confocal cavity 20. The light image continues onto the first reflector 22 which re-collimates the light source and directs the re-collimated beam onto reflector 22'. This multiple reflection process is repeated an infinite number of times with diminishing intensity as a result of the small amount of transmission of light through reflector 22'.

The transmitted beam 28 from successive reflections in cavity 20 is directed by a collector 72 onto a secondary reflector 74 oriented and shaped to direct the transmitted beam onto the detector 32 with the objective 76. The collecting optics is of the Maksutov type.

The confocal cavity 20 is formed with a cylindrical housing 78 which is supported generally in the center of rectangular housing 40 with soft rubber mounts 80. Cavity 20 has a gas inlet port 82 and a gas outlet port 84 at generally opposite cavity ends. A fan 86 driven by electric motor 88 provides a flow of air from main gas inlets 90 through an air filter 92 and a duct 94 into a tube 96 coupled to cavity inlet port 82.

Motor 88 has a shaft 98 which supports an optical filter wheel 100 around which the fan 86 is assembled. Filter wheel 100 carries optical elements which are rotated past detector 32 to chop the optical energy incident thereon into absorption band light energy and reference light energy. The electrical signal from detector 32 is thereupon processed to compare signals indicative of the transmission of the absorption light energy and reference light energy to provide an indication of the amount of carbon monoxide in the air.

Filter wheel 100 includes, as shown in FIG. 2, the fan blades 86 located at the perimeter and a plurality of optical windows 102 in circumferential alignment and radially spaced for passage past objective 76 and detector 32. Optical windows 102.1 and 102.2 are formed of an interference filter such as for passing light wavelengths which are absorbed by carbon monoxide. Optical windows 102.3–102.6 are formed of an optical material which passes light at a reference wavelength outside the absorption band for carbon monoxide.

Since optical windows 102 pass detector 32 in sequence, apertures such as 104 are provided in filter wheel 100 in alignment with optical windows 102 to enable the generation of control signals to identify each window passing detector 32. Thus superimposed with filter wheel 100 is shown a photo detector block 106 (mounted behind wheel 100) carrying photo detectors 108 which are so radially located that selected apertures 104 pass between detectors 108 and the light beam 28. In effect, therefore, three output control signals (corresponding with aperture pairs 104.1–104.2; 104.3–104.6, and 104.4–104.5 are generated (see FIG. 5). These control signals occur commensurate in time with the passage of an associated optical window 102 past detector 32.

The circumferential length of apertures 104 is selected commensurate with the duration of passage of an optical window 102 past detector 32. Thus with reference to FIG. 5, the photo detectors 108.1, 108.2 and 108.3 produce output signals on lines 110 to control actuation of a network 112 which effectively compares the light energy in the absorption band of carbon monoxide with reference light energy outside this band. Network 112 may be in a variety of forms with the circuitry in FIG. 5 being illustrative.

The output from detector 32 is amplified by amplifier 114 and applied to sampling input 116, 118 of sample and hold networks 120.1 and 120.2. The latter are selectively actuated by the signals on a pair of lines 110. Sample and hold network 120.2 is actuated by either signals on line 110.2 or 110.3 depending upon the position of series connected switch 122. Signals on line 110.3 correspond to the passage of an optical window 102.3 or 102.6 past detector 32. The windows 102.3 and 102.6 provide a light filtering of sufficient magnitude to enable the detection of a high level of carbon monoxide in the neighborhood of 100 parts per million. Correspondingly, line 110.2 carries signals identifying passage of optical windows 102.4 and 102.5 which are formed of an optical material which permits detection of a low level of carbon monoxide such as of the order of ten parts per million.

The signals sampled and stored in networks 120.1 and 120.2 are compared in a comparison amplifier 124 whose output signal has a magnitude indicative of the difference in transmission of light at the absorption wavelength from that at the reference light wavelength. The output signal may then be displayed on a suitable meter 126 to register an indication of the amount of carbon monoxide.

In the design of the optical gas sensor, aberration of the reflected radiation beams is reduced by making reflectors 22-22' of sufficient size. In addition, the images are made as small in size as possible to increase the light energy incident upon detector 32.

Having thus described an optical gas sensor in accordance with the invention, its many advantages may be appreciated.

What is claimed is:

1. An apparatus for detecting a particular gas in a gaseous mixture by utilizing light energy of a wavelength tending to be absorbed by the particular gas comprising:

a confocal light cavity sized to contain a measurable quantity of the particular gas, said confocal cavity being formed by a pair of opposing reflectors mounted in spaced apart coaxial relation in a housing to define a gas chamber cavity therebetween, said reflectors being partially transmissive and adapted to reflect the major portions of light impinging thereon, the opposing faces of said reflectors being substantially spherical surface segments;

light source means for producing a single collimated beam of light that includes light energy in an absorption band of the particular gas and reference light energy effectively outside of said absorption band; said light source means being mounted for directing said beam coaxially through one of the reflectors into said cavity, said light source means and said one reflector being dimensioned so that said beam directed into said cavity fills the major portion of the diameter of the cavity, and said opposing substantially spherical, surface segments being of equal radius of curvature spaced from each other along their common axis a distance equal to twice said radius for a maximum number of reflections of said beam within the cavity;

means for introducing said gas into said cavity;

means for collecting light energy transmitted out from said cavity through the other of said reflectors;

means responsive to the collected light energy for producing a first signal representative of the magnitude of the collected light; and means responsive to said first signal for producing an output signal indicative of the amount of said particular gas within the confocal cavity.

2. The apparatus for detecting the particular gas as claimed in claim 1 wherein the collecting means is operatively located to collect light transmitted through the other of said light reflectors; and further including means for driving a gaseous mixture (through the gas inlet port) into the gas chamber cavity to monitor the gaseous mixture for the magnitude of the particular gas mixed therein.

3. The apparatus for detecting the particular gas as claimed in claim 2 wherein said output signal producing means further includes a filter wheel mounted for rotation between the first signal producing means and the collected light energy, said filter wheel being provided with optical windows formed of material selected to chop the collected light into light within the absorption band of the particular gas and reference light of a wavelength outside of said absorption band.

4. The apparatus for detecting the particular gas as claimed in claim 3 wherein the gaseous mixture driving means includes a fan and motor driving the fan, said fan being mounted on the filter wheel for common rotational drive by the motor.

5. The improved optical gas detector as claimed in claim 1 wherein the (confocal cavity is sized to detect the particular gas of carbon monoxide,) light source means is adapted to produce a single collimated beam of light that includes light energy in an absorption band of carbon monoxide and light energy outside said absorption band, and wherein said (gas) first signal producing means includes filter means for passing light in the output beam within the absorption band of carbon monoxide.

6. The improved optical gas detector as claimed in claim 5 wherein said output signal producing means further includes filter means for passing light in the output beam in a reference band of wavelength lying outside the absorption band for carbon monoxide.

* * * * *

UNITED STATES PATENT OFFICE
CERTIFICATE OF CORRECTION

Patent No. 3,861,809                Dated January 1, 1975

Inventor(s) Joseph F. Hall, Jr.

It is certified that error appears in the above-identified patent and that said Letters Patent are hereby corrected as shown below:

Column 2, line 61, change "radius of curvature" to --focal length--.

Column 3, line 50, change "radial center" to --focal point--.

Column 6, line 1, delete "twice".

Signed and Sealed this twenty-fourth Day of February 1976

[SEAL]

Attest:

RUTH C. MASON
*Attesting Officer*

C. MARSHALL DANN
*Commissioner of Patents and Trademarks*